United States Patent
Tenney

(10) Patent No.: US 7,568,876 B1
(45) Date of Patent: Aug. 4, 2009

(54) PORTABLE LOG SKIDDER

(76) Inventor: Franklin R Tenney, P.O. Box 27, Masontown, WV (US) 26542

( * ) Notice: Subject to any disclaimer, the term of this patent is extended or adjusted under 35 U.S.C. 154(b) by 260 days.

(21) Appl. No.: 11/551,740

(22) Filed: Oct. 23, 2006

(51) Int. Cl.
B66D 1/00 (2006.01)

(52) U.S. Cl. ...................................... 414/538
(58) Field of Classification Search ................. 414/537, 414/538
See application file for complete search history.

(56) References Cited

U.S. PATENT DOCUMENTS

| | | | | |
|---|---|---|---|---|
| 2,131,402 | A | * | 9/1938 | King .......................... 414/538 |
| 2,428,085 | A | * | 9/1947 | Largen ........................ 254/325 |
| 2,537,326 | A | * | 1/1951 | Brawand ................... 24/115 R |
| 2,797,889 | A | * | 7/1957 | Talboys ....................... 254/18 |
| 3,339,656 | A | | 9/1967 | Blonsky |
| 3,651,623 | A | * | 3/1972 | Harley ........................ 56/15.5 |
| 3,971,484 | A | * | 7/1976 | Anderson et al. ........... 414/559 |
| 4,278,392 | A | | 7/1981 | Meisel, Jr. |
| 4,529,350 | A | | 7/1985 | Jones |
| 4,540,328 | A | | 9/1985 | McManama |
| 4,556,358 | A | | 12/1985 | Harlan |
| 4,601,633 | A | | 7/1986 | F'Geppert |
| 5,052,880 | A | | 10/1991 | Ross |
| 5,480,041 | A | | 1/1996 | Turner |
| 5,876,174 | A | | 3/1999 | Arsenault |
| 6,155,771 | A | | 12/2000 | Montz |
| 6,231,030 | B1 | * | 5/2001 | Smith .......................... 254/324 |
| 6,446,889 | B1 | * | 9/2002 | Moore .......................... 241/92 |
| 6,463,613 | B1 | * | 10/2002 | Thompson ................... 14/69.5 |
| 6,607,345 | B2 | | 8/2003 | McElhany |
| 6,799,935 | B1 | | 10/2004 | Grollitsch |

* cited by examiner

*Primary Examiner*—Charles A Fox
(74) *Attorney, Agent, or Firm*—Dinsmore & Shohl, LLP

(57) ABSTRACT

A portable log skidder is disclosed, having a base frame with an axle and a pair of wheels at the rear end and a trailer coupler at its front end. A winch with a motive or power source and a cable-winding drum is mounted on the base frame near its front end. A fixed pulley is mounted on the base frame near its rear end. Three support columns for a tripod-like support frame are provided above the base frame. A plurality of accessory attachment fittings are disposed around the support columns. A movable pulley is connected to one of the accessory attachment points. A log bunk is located at the rear of the base frame, to which a log chute is attached. A stabilizer is provided that articulates with the log chute. A cable wound on the drum of the winch has a free end engaging the fixed pulley, the moveable pulley and, finally, a log to be hauled aboard the portable log skidder.

9 Claims, 6 Drawing Sheets

PORTABLE LOG SKIDDER

BACKGROUND OF RELEVANT PRIOR ART

The present invention relates to a portable log skidder, specifically to a trailer capable of being towed by an all-terrain vehicle and of hoisting on board logs and cut timber.

In the timber industry, large trees are cut down and delimbed. The bare logs are then removed from the forest using various mechanized systems. These systems are large and expensive and require a long period of use to recoup the owner's investment.

Many private or individual landowners have wooded plots from which they occasionally or periodically desire to remove trees or fallen timber. They may desire to remove trees to improve the overall health of the forest by selective thinning, or to use the remove timber for firewood or to have cut for small lots of sawn lumber.

Cut trees or timber of a useful size are typically too large for an unassisted individual to haul out of the forest. This difficulty is often compounded because the forest is located on a hillside. Woodlot owners typically must use a vehicle, such as a four-wheel drive all-terrain vehicle ("ATV") to access and remove the fallen or cut timber.

However, using an ATV to simply pull a log out of a forest is difficult. When pulling a timber by a cable attached to an ATV, the front end of the log can dig into the ground or catch on rock outcroppings, boulders or undergrowth. When a dragged log catches in such a manner, it can overturn the towing ATV, causing great risk of injury to the driver, or it can cause significant damage to the frame of the ATV.

To avoid some of these dangers in dragging or otherwise removing a fallen timber or log from a forest, various types of "skidders" are used to raise the front end of a log up and partially onto the skidder, leaving only the trailing end of the log to drag along the ground. This provides less chance of catching on outcroppings or digging into the soil.

A number of examples of skidders are provided in the prior art.

U.S. Pat. No. 6,231,030, issued to Smith, discloses a log skidding trailer with a winch and a single fixed, rigid, near vertical hoist supporting a winch operating a lift cable running through a snatch block at the top end of the hoist.

U.S. Pat. No. 6,155,771, issued to Montz, discloses a simple hoist with boom at its top which can be attached to the end of a pickup truck bed.

U.S. Pat. No. 5,876,174, issued to Arsenault, discloses an improvement on traditional, horse-drawn log transporters, having a simple cantilever frame that may attach to an all-terrain vehicle. It must be positioned over the log, which is then attached to the trailer while its center beam is articulated upwards and raised up by a cantilever action to it by pulling the front end of the center beam down.

U.S. Pat. No. 5,061,150, issued to Rentscheler, discloses a single-handed skidding apparatus comprising a pair of grappling hooks. No cable is provided, and the apparatus must be positioned directly over the log which is to be transported.

U.S. Pat. No. 5,010,933, issued to Doyle, teaches of a skidding vehicle with a winch and a hoist which articulates with the vehicle frame to raise and lower a hoist pulley. A complicated system of springs is used to articulate the hoist.

SUMMARY OF THE INVENTION

The present invention is a log skidder capable of being towed by a one-man all-terrain vehicle and skidding a single log from a woodlot or forest, even under conditions of rugged terrain. The invention comprises a base frame parallel to the ground surface, with a trailer coupler at its front end wheels place on the underside of the base frame near its rear end section rotationally engaging the base frame by means of an axle or the like. A winch with a drum or spool capable of winding on a length of cable is located on the base frame near its front end. A fixed pulley is mounted near the rear end of the base frame, aligned with the drum of the winch. An elongated log bunk is mounted transversely on the end of the base frame. Three support columns for a tripod support on the base frame. Two of the support columns attach by bottom ends to either end of the log bunk. A cross member spans the top ends of the support columns. A third, center support column attaches by its bottom end to the base frame forward of the winch and attaches by its top end to the center of the cross member.

A plurality of accessory attachment fittings are provided along the bottom side of the center support column, as well as along the bottom side of the cross member. One or more movable pulleys may be attached to these accessory attachment fittings. By placing the movable pulley at different accessory attachment fittings, the angle at which a hauling cable attaches with a log will vary. By placing the movable pulley at a lower position, the tension from the cable is exerted on the trailer lower to its center of gravity, thereby increasing the stability of the trailer and permitting greater force on the cable for pulling a log without destabilizing or tipping the log skidder. By placing the movable pulley at a higher position, the cable will meet with a log at a greater angle to the ground, tending more to lift the front end of the log off the ground. This is especially more useful when the log has been pulled to the log skidder and is to be brought on board it.

To aid in bringing a log on board the log skidder, the rear end of the log skidder has a log bunk, a log chute and a stabilizer. The log chute is a guide plate which directs the front end of a log up and towards the center of the log bunk. The log bunk is not straight, but instead is curved or bent generally upward from its center, with its medial point disposed lowest to the base frame. The stabilizer, attached to the log chute, restrains the log skidder from sliding backwards while hauling in a log.

These and other objectives and advantages of the invention will become apparent from the description which follows. In the description, reference is made to the accompanying drawings, which form a part hereof, and in which is shown by way of illustration specific embodiments in which the invention may be protected. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

DESCRIPTION OF THE PREFERRED EMBODIMENTS

The following discussion describes in detail one or more embodiments of the invention. The discussion should not be construed, however, as limiting the invention to those particular embodiments, and practitioners skilled in the art will recognize numerous other embodiments as well. The complete scope of the invention is defined in the claims appended hereto.

Figure 1:
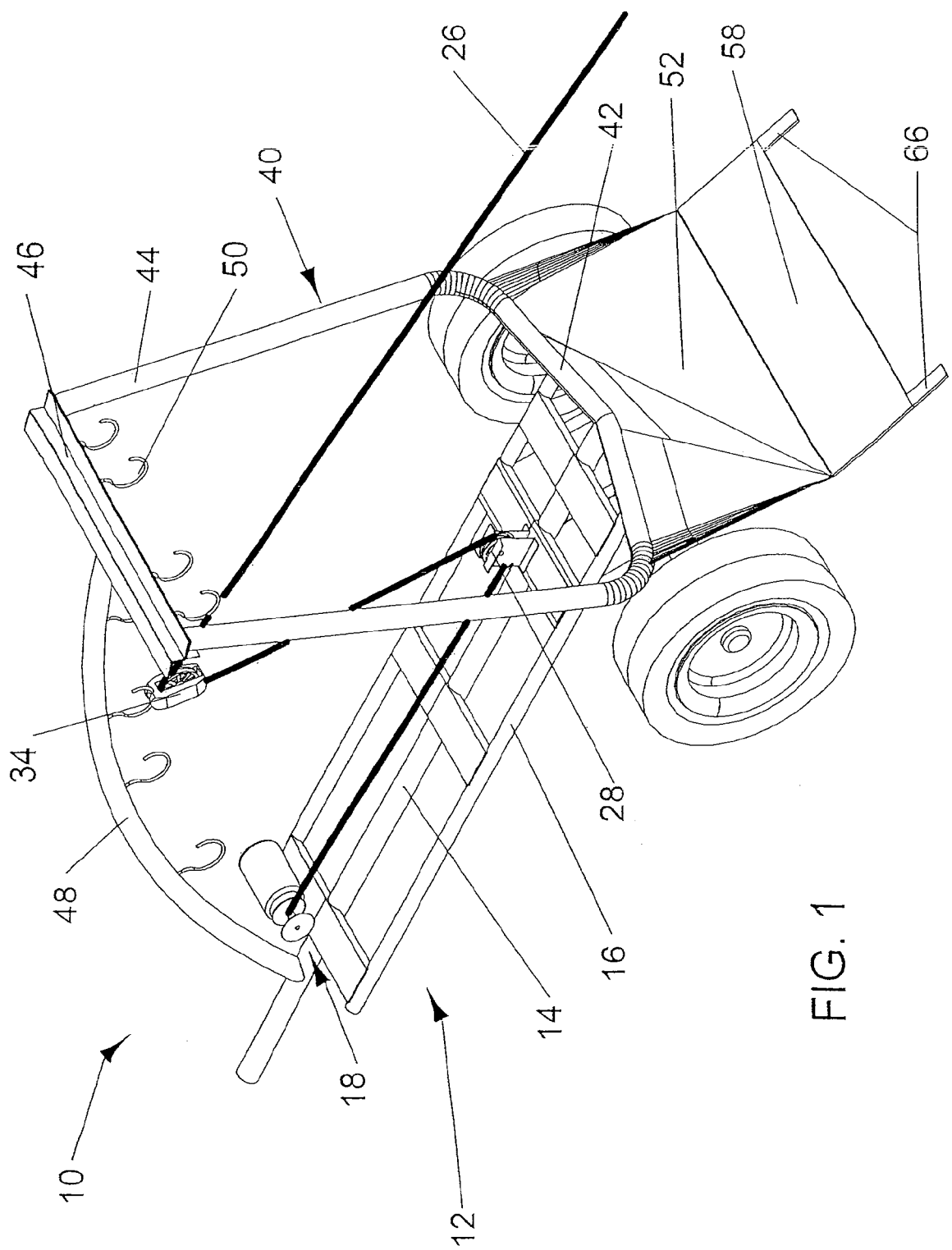
FIG. 1 is an isometric view of the portable log skidder, viewed from the above rear left view.
Figure 2:
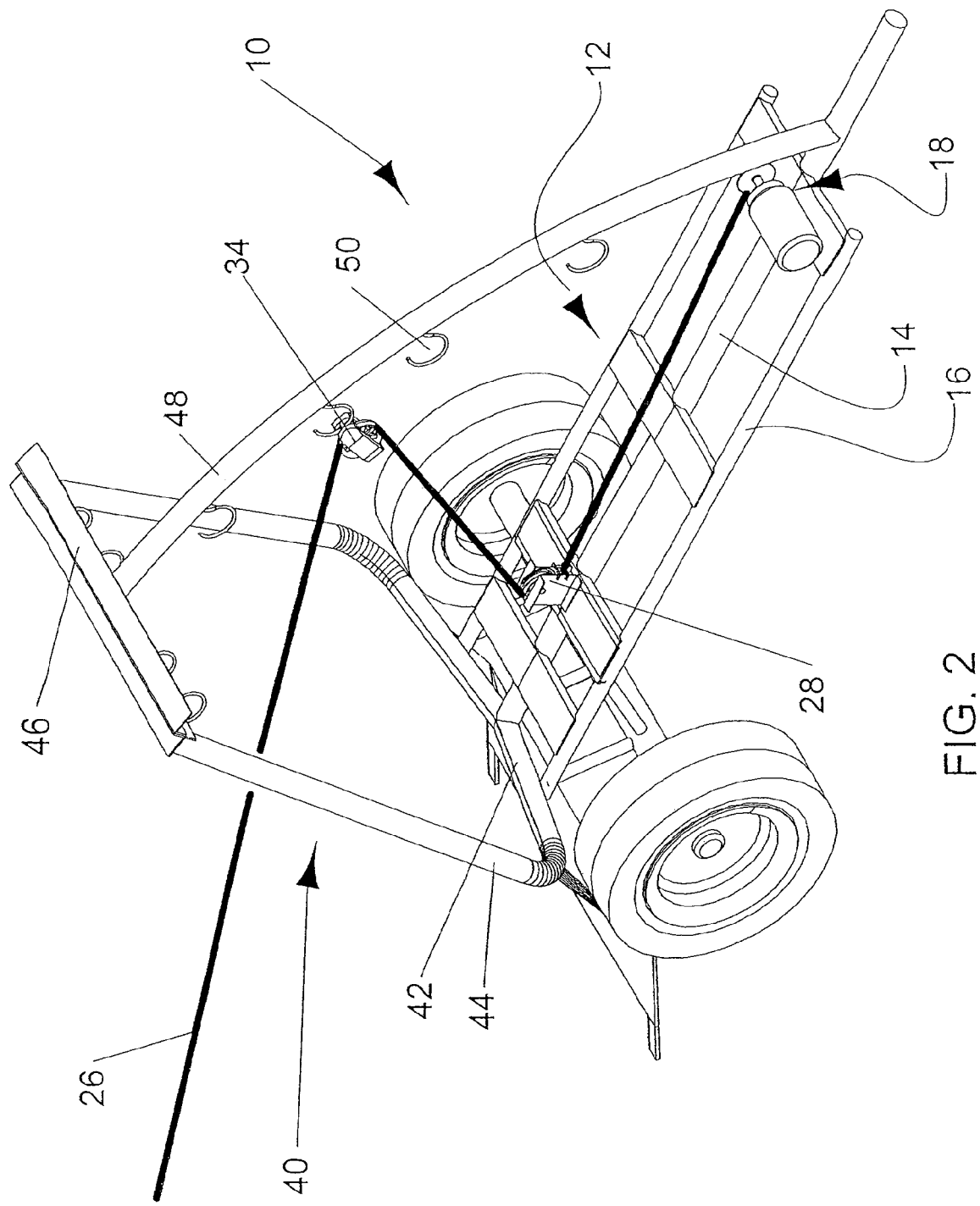
FIG. 2 is an isometric view of the portable log skidder, viewed from the above front right view.

As illustrated in FIGS. 1 and 2, a portable log skidder 10 comprises, in part, of a base frame 12. The base frame 12 provides a structural platform or foundation upon which the other components of the portable log skidder 10 are assembled. The base frame 12 is an assembly of elongated structural components and members commonly found in the art. These structural members are typically elongated metal tubes and may have one or more of various cross-sectional shapes, including circular or rectilinear. The structural members are joined by commonly known methods, such as welding or bolted fasteners.

The base frame 12 has a front end and a rear end. The front end is that end at which would connect to or couple with a vehicle, such as an All-Terrain Vehicle, or "ATV", for towing the portable log skidder 10, while the rear end is located at the end opposite from the front end and is the end at which logs 64 or timber which are to be transported are brought onto the portable log skidder 10. For the purpose of description, an imaginary longitudinal axis is considered traversing the length of the portable log skidder 10 from the front end to the rear end, while a transverse axis is considered traversing the width of the portable log skidder 10 perpendicular to the longitudinal axis. A vertical axis is considered, for the purpose of description, extending in the vertical plane perpendicular to the longitudinal and transverse axis. In normal use of the invention, the longitudinal and transverse axes are parallel to the ground surface, and the vertical axis is orthogonal to the ground surface.

As used herein, the terms "longitudinal" or "longitudinally" refer to a direction parallel or collinear with the longitudinal axis. The terms, "transverse" or "transversely" refer to a direction parallel or collinear to the transverse axis. The terms, "vertical" or "vertically" refer to a direction parallel or collinear with the vertical axis.

As used herein, the term, "frontal plane" refers to that plane that divides the invention into front and rear sections and is orthogonal to the longitudinal axis. The transverse and vertical axes lie within the transverse plane.

The term, "horizontal plane" refers to a plane that divides the invention into upper and lower sections, and is orthogonal to the vertical axis. The longitudinal and transverse axes lie within or are parallel to the horizontal plane.

The term, "medial plane" refers to a plane that divides the invention into left and right sections, and is orthogonal to the transverse axis. The longitudinal and vertical axes lie within or are parallel to the medial plane.

One preferred design of the base frame 12 has a central support beam 14 traversing longitudinally the length of the portable log skidder 10, and two additional side support beams 16 traversing longitudinally on either side of the central support beam 14, for at least a part of the overall length of the base frame 12 to provide additional support where needed, and additional bracing assembled transversely between the central support beam 14 and the side support beam 16.

In an alternate embodiment, the base frame 12, may comprise a truss (not shown) assembled from a plurality of struts or structural members, rather than one or more longitudinal support beams 14, 16.

Figure 5:
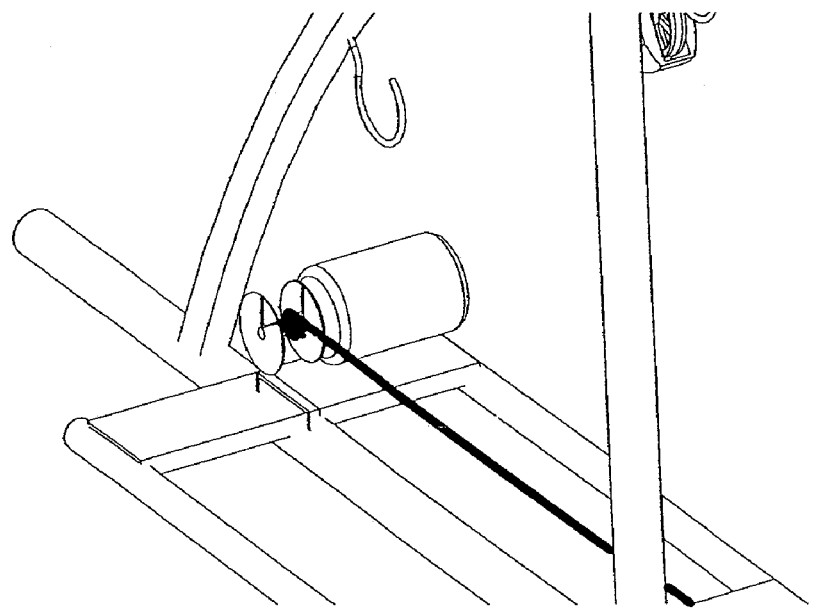
FIG. 5 is an isometric view of the winch assembly.

Mounted on or substantially near the longitudinal centerline of the base frame 12, near or proximal to its front end, is a winch 18. As better shown in FIG. 5, a winch 18 typically has a motive force 20, such as a motor or engine, for providing rotation and torque on an axial shaft 22 one end of which protrudes from the motive force 20, and a generally cylindrical drum 24 mounted on the protruding end of the axial shaft 22. The motive force 20 may be a 12-volt, direct current electric motor, capable of receiving D.C. electric power from an ATV or other vehicle towing the portable log skidder 10. In another embodiment, the motive force 20 is a gasoline engine, which allows the portable log skidder 10 to be decoupled from and operate independently from a towing vehicle. In another embodiment, the motive force 20 is supplied by the towing vehicle engine through a PTO linkage.

The winch 18 is mounted with its axial shaft 22 aligned transversely to the base frame 12 and with the longitudinal center of the drum 24 substantially aligned with the longitudinal centerline of the base frame 12.

The drum 24 on the winch 18 has a length of cable 26, rope or the like wound around its circumference. The cable 26 has a free end which can be spooled out as described below to attach to and haul in a fallen timber or log 64. A clutch (not shown) is commonly provided to allow the drum 24 to turn freely to allow spooling out of the cable 26, but to engage for rotating the drum 24 in the opposite direction to haul in the cable 26 under load of a log 64. Speed controls are typically provided as well to control the rate at which the cable is retrieved and rewound on to the drum 24.

Figure 6:
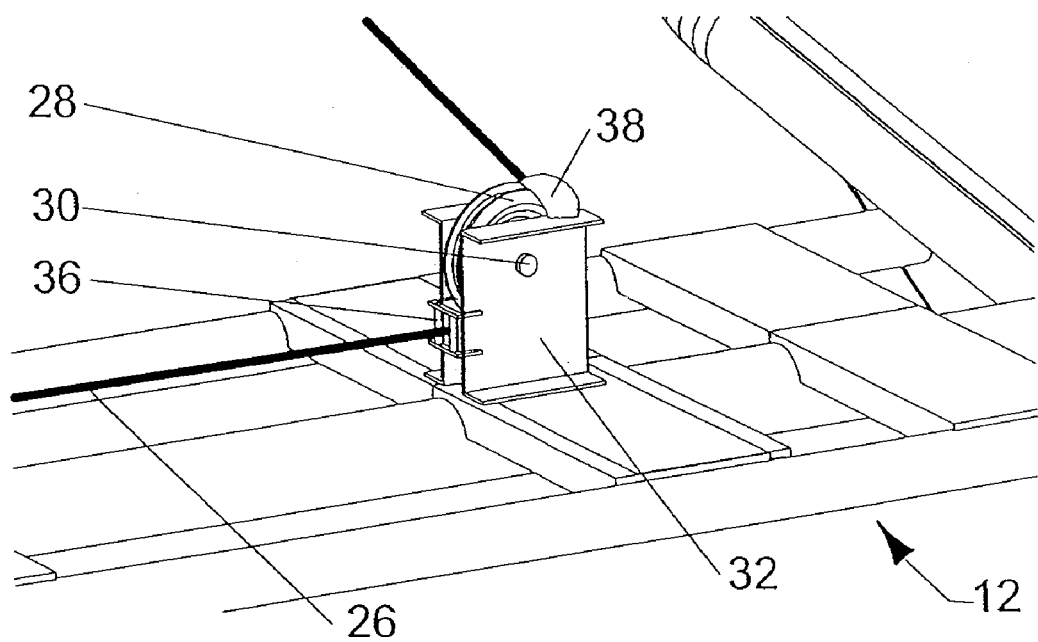
FIG. 6 is an isometric view of the fixed pulley assembly.

A fixed pulley 28, better shown in FIG. 6, is disposed on the base frame 12, proximate to its rear end. The fixed pulley 28 typically has a pulley axle 30 about which the pulley rotates freely. The pulley 30 axle is mounted in a fixed frame 32 which is secured to the base frame 12 by means commonly available in the art. The pulley axle 30 is aligned transversely on the base frame at substantially the same vertical distance above the base frame 12 as the winch axial shaft 22. The longitudinal center of the fixed pulley 28 is aligned with the longitudinal center of the drum 24.

The free end of the cable 26 which is spooled from the drum 24 will first pass around the fixed pulley 28, passing around the fixed pulley 28 from bottom to top and continue on to a movable pulley, described below. A cable 26 operating on the fixed pulley 28 must engage and disengage the pulley rim substantially radial to the fixed pulley 28, or the cable 26 may "jump off" or dislodging from the rim of the fixed pulley 28. Because the length of the drum 24 is greater than that of the fixed pulley 28, the cable 26 will not necessarily engage the fixed pulley 28 at a precise radial alignment, but may engage it at a slight angle to the fixed pulley's 28 radius. In such an angular engagement, the cable 26 may catch on the rim of the fixed pulley 28 and be dislodged out of the rim of the fixed pulley 28. To prevent this, the fixed frame 32 has a pair of vertical rollers 36 disposed forward of the fixed pulley 28 and aligned with the lower half of the fixed pulley 28. The vertical rollers 36 accept the cable 26 at lateral angles from the fixed pulley 28 radius, and guide it radially onto the pulley rim.

Figure 7:
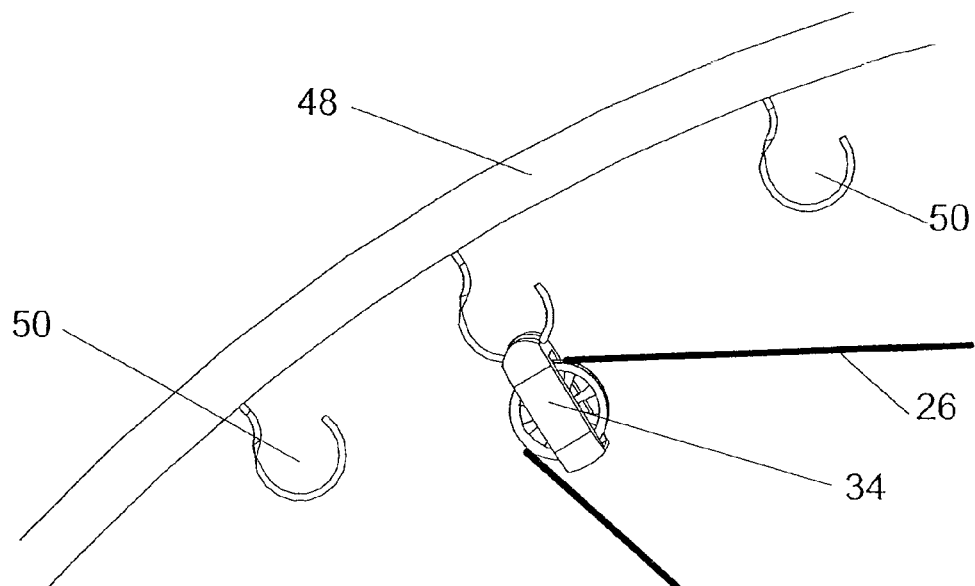
FIG. 7 is an isometric view of the movable pulley.

On the opposing side of the fixed pulley 28 is a pair of cable guides 38 to maintain the cable 26 on the fixed pulley 28 rim as the cable 26 disengages from the fixed pulley 28 and proceeds to a movable pulley 34. The movable pulley 34, as shown in FIG. 7, may be disposed laterally offset from the centerline of the base frame 12, resulting in an angle between the fixed pulley 28 and the cable 26 as it exits the fixed pulley 28 and traverses to the movable pulley 34. The cable 26 guides maintain a radial alignment of the cable 26 as it disengages the pulley rim, preventing the cable 26 from dislodging from the rim.

Figure 4:
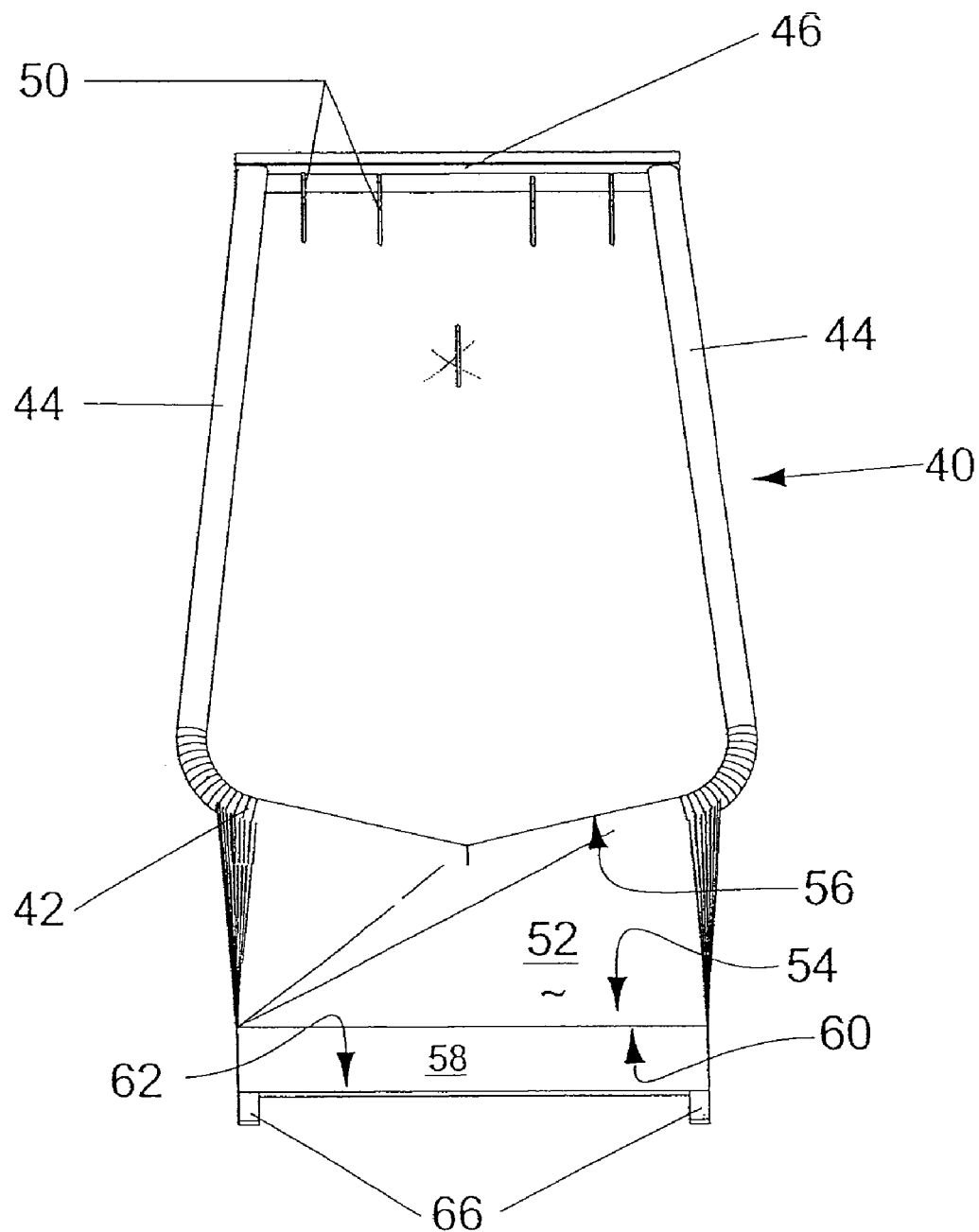
FIG. 4 is an elevational view of the rear components of the portable log skidder, viewed from the rear.

At the rear end section of the base frame 26, better shown in FIG. 4, is disposed a rear frame assembly 40. A log bunk 42 is located at the bottom of the rear frame assembly. The log bunk 42 is a generally horizontal, elongated member attached at its middle transversely to the base frame 12. The log bunk 42 is preferably not straight, but rather either angled or curved upward, the center of the log bunk 42 positioned lowest to the base frame 12. Two elongated rear support columns 44 further comprise the rear frame assembly 40. Each rear support column 44 attaches by its lower end to either end of the log bunk 42. The log bunk and two rear support columns 44 are typically fabricated from tubular structural members. A cross member 46 further comprises the rear frame assembly 40. The cross member 46 is preferably fabricated from plate or angle members, but may use structural tubing or other structural shapes as well. Either end of the cross member 46 attaches to the upper ends of the two rear support columns 44. Together the log bunk 42, the two rear support columns 44 and the cross member 46 are co-planar and form a closed frame.

Figure 3:
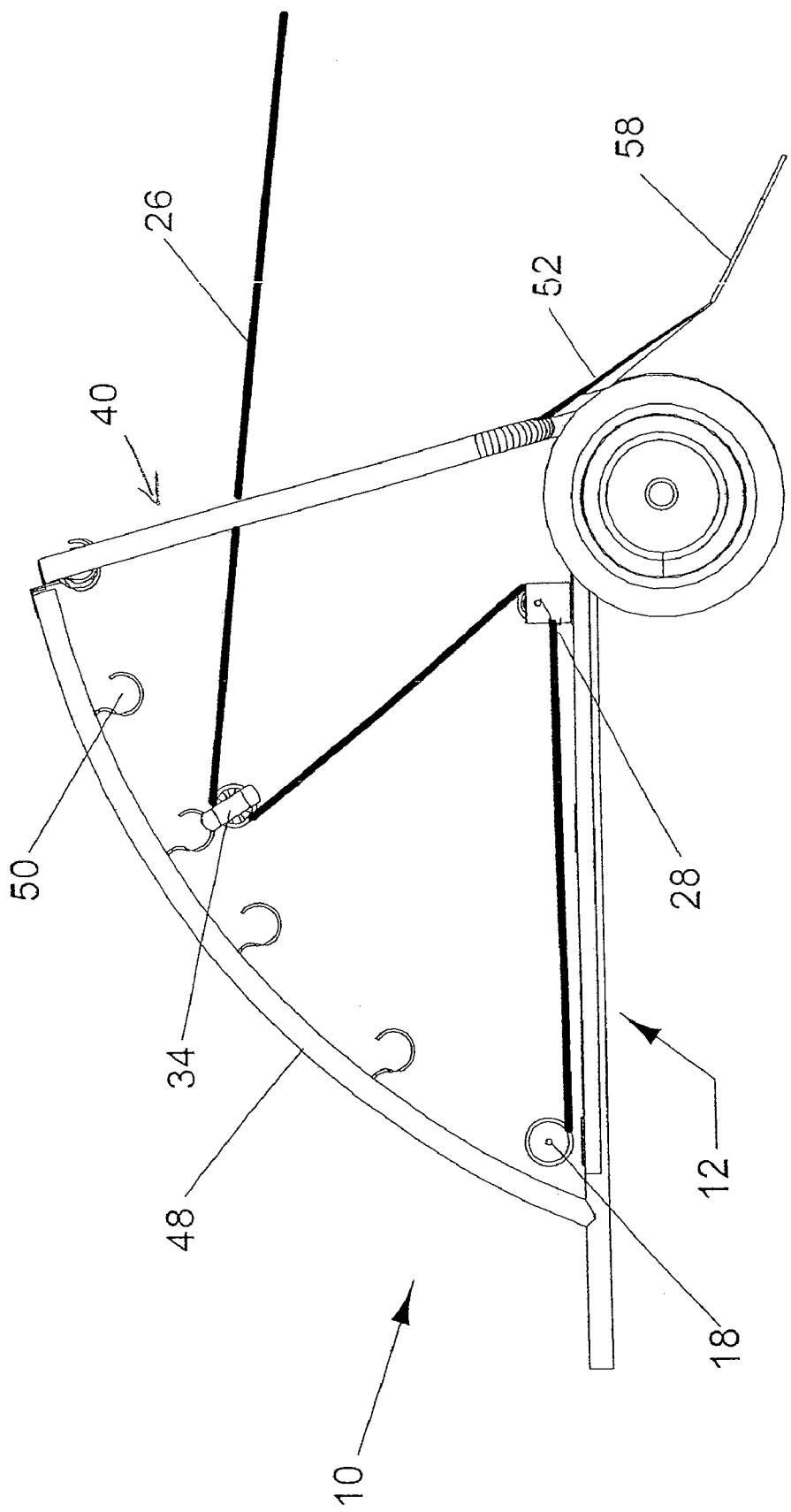
FIG. 3 is an elevation view of the portable log skidder, viewed from the left view

Turning to FIG. 3, the rear frame assembly attaches to the rear end section of the base frame 12. The plane of the rear frame assembly 40 is parallel to the transverse axis but is not parallel to the transverse plane. The plane of the rear frame assembly 40 is pitched forward and downward toward the horizontal plane from the transverse plane by, preferably, about 10°.

The log skidder 10 further comprises an elongated center support column 48. The center support column 48 has a lower end section which attaches to the forward end section of the base frame 12, forward of the winch 18. The upper end section of the center support column 48 attaches to the center of the cross member. The center support column 48 is preferably curved or arcuate but preferably lies within the medial plane containing the center support beam.

Disposed on the interior side of the center support column 48 are one or more accessory attachment fittings 50. They are typically, but not necessarily, spaced at substantially equal intervals on the length of the center support column 48. These accessory attachment fittings 50 provide a means for attaching or securing a variety of accessories, such as movable pulleys 34, pulley blocks, or "come-alongs" to the center support column. These accessory attachment fittings 50 may be simple loops, lugs, rings, hooks, hangers or the like onto which an accessory can be hung, attached or secured. One or more accessory attachment fittings 50 are also provided along the bottom or lower edge of the cross member 46.

The various accessories which can be attached to the log skidder 10 may include movable pulleys 34, pulley blocks, sheeves, or like devices capable of routing a cable, line, rope, etc. in a different direction. The accessory is attached to an accessory attachment fitting 50. The cable 26 emanating from the fixed pulley 28 is routed around the rim of the movable pulley 34 from the front and around the top. The cable 26 then proceeds from the movable pulley 34 through the interior opening of the rear frame assembly 40 and onward behind the log skidder 10 to a log 64 or timber which is to be hauled aboard the log skidder 10.

To facilitate hauling a log 64 on board the log skidder 10, a log chute 52 is disposed at the rear end section of the log skidder 10. As best shown in FIG. 3, the log chute 52 is a plate having a straight chute rear edge and a forward edge curving or bending upward towards its transverse ends. The straight chute lower edge is parallel to the transverse axis. The chute forward edge shape is congruent to that of the log bunk, and attaches thereto. The longitudinal centerline of the log chute 52 is tilted downward and rearward at an angle of approximately 15°.

A stabilizer 58 having a straight stabilizer upper edge 60 articulates with the chute rear edge 54. The stabilizer 58 is a plate which has a stabilizer lower edge 62 that may rest on the ground or have elongated stabilizer extensions 66 from the stabilizer lower edge 62 to rest on the ground. The stabilizer extensions 66 which may extend from the stabilizer lower edge 62 either longitudinally or at a transverse angle outward from the longitudinal centerline of the stabilizer 58. The stabilizer lower edge 62, along with the stabilizer extensions 66, if present, rests on and braces into the ground surface to anchor the log skidder 10 and resist rearward motion when a log 64 is hauled to an on board the log skidder 10. When not in use, the stabilizer 58 may be articulated upward around the stabilizer upper edge 60 and secured in the elevated position with a chain or the like. This will prevent the stabilizer lower edge 62 from dragging on the ground.

Figure 8:
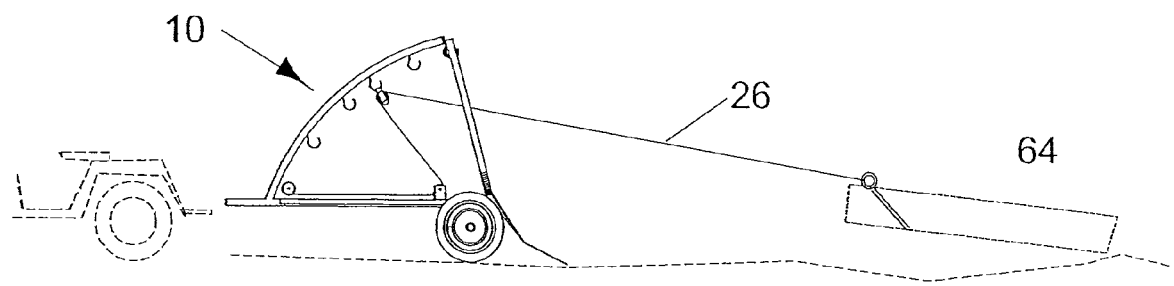
FIG. 8 is an elevational view of the portable log skidder, shown in operation.

In use, as shown in FIG. 8, the log skidder 10 is towed to a site at which cut timber or logs 64 are present which are desired to be removed from the site. The log skidder 10 is designed to be towed by an all-terrain vehicle, which provides the best ability to access difficult, sloped terrain for small haulage projects.

The log skidder 10 is positioned with its rear end directed towards the logs 64 or cut timber which are desired to be hauled. The stabilizer 58 is lowered to plant the stabilizer lower edge 62 and the stabilizer extensions 66, if any, into the ground. Then, a movable pulley 34 is positioned on one of the accessory attachment fittings 50. The fittings 50 selected will depend on the distance and direction to the log 64 and the type of terrain across which the log 64 must be pulled. For logs 64 that are a greater distance away or will be hauled across relatively smooth terrain, the movable pulley 34 will normally be attached to an accessory attachment fitting 50 forward and lower on the center support column 48. As the log 64 approaches the log skidder 10, or is blocked or entangled in undergrowth or rocks, the movable pulley 34 can be moved to an accessory attachment fitting 50 higher and more rearward on the center support column 48. This will raise up the front end of a log 64, causing it to clear an obstacle or to be lifted onto the log chute 52 and over the log bunk 42. Once the front end of a log has cleared the log bunk 42, the movable pulley 34 can be repositioned to a more forward accessory attachment fitting 50 to haul a greater portion of the log 64 on the log bunk 42. The log 64 can then be secured to the portable log skidder 10 with come-alongs attached to other accessory attachment fittings 50.

While various embodiments of the invention have been described above, it should be understood that they have been presented by way of example, and not limitation. It will be apparent to persons skilled in the relevant art that various changes in form and detail may be made therein without departing from the spirit, and scope and application of the invention. This is especially true in light of technology and terms within the relevant art that may be later developed. Thus, the present invention should not be limited by any of the above-described exemplary embodiments, but should only be defined in accordance with the appended claims and their equivalents.

I claim:

1. A portable log skidder for hauling fallen timber and logs, comprising:
   a. a base frame, the base frame having a front end section and a rear end section and having a longitudinal axis traversing the frame between the front end section and the rear end section and a transverse axis perpendicular to the longitudinal axis;
   b. a winch disposed on the base frame proximate to the base frame front end; the winch comprising a motive force, an axial shaft and a drum, the axial shaft having a rotation axis parallel to the base frame transverse axis;
   c. a fixed pulley disposed on the base frame proximate to the rear end section of the base frame, the fixed pulley having a rotation axis parallel to the winch rotation axis;
   d. a rear support frame, the elements of said rear support frame comprising two rear support columns each having an upper and a lower end section; an angled or curved log bunk having two end sections, and a linear cross member having two end sections, wherein each of the rear support column lower ends are disposed on either end section of the log bunk, each of the rear support column upper ends are disposed on either end section of the cross member, the two rear support columns, log bunk and cross member of the rear support frame being assembled within a plane;
   e. a curvilinear front support column having an upper and a lower end section, wherein the front support column lower end section is disposed on the base frame proximate to the base frame front end section and the front support column upper end section is disposed on the rear support frame cross member, medially between the two cross member end sections, the front support column further comprising a plurality of accessory attachment fittings, the fittings disposed at intervals along the length of the front support column;
   f. one or more wheels on the log skidder;
   g. a log chute having an upper edge and a lower edge, wherein the upper edge is congruent with and rigidly disposed on at least part of the length of the log bunk, the lower edge is straight, and the surface of the log chute is warped; and
   h. a stabilizer, the stabilizer having an upper edge articulating with the log chute lower edge.

2. The portable log skidder of claim 1, further comprising a plurality of accessory attachment fittings disposed on the rear support frame cross member.

3. The portable log skidder of claim 1, further comprising a pair of braces, each brace of the pair having a front end section disposed on the front support column and a rear end section on either of the rear support frame rear support columns, each of the braces further comprising at least one accessory attachment fitting.

4. The portable log skidder of claim 1, further comprising at least one portable pulley, each of the at least one portable pulleys disposed on one of the front support column accessory attachment fittings.

5. The portable log skidder of claim 4, further comprising a cable engaging the winch, the first pulley and at least one portable pulley.

6. The portable log skidder of claim 1, further comprising a hitch coupler disposed at the base frame front end section.

7. The portable log skidder of claim 1, wherein the winch is powered by a motive source selected from the group consisting of an electric motor, a gasoline engine and a PTO coupling.

8. The portable log skidder of claim 1, wherein the plane of the rear support frame is at an acute angle with a vertical and a frontal plane.

9. The portable log skidder of claim 1, wherein the log bunk comprises a top edge, the top edge being curvilinear or angular with a minimum point disposed medially along the top edge.

* * * * *